(12) United States Patent
Tupinier et al.

(10) Patent No.: US 8,093,546 B2
(45) Date of Patent: Jan. 10, 2012

(54) OUT-OF-ROUND CODER

(75) Inventors: Laurent Tupinier, Reichstett (FR);
Olivier R. Marroux, Biard (FR);
Johann Michel, Reichstett (FR);
Paul-Antoine Tritschler, Illkirch (FR);
Nandiaye Ndao, Strasbourg (FR);
Bernard Kress, Neubourg (FR)

(73) Assignees: Delphi Technologies, Inc., Troy, MI (US); Universite Louis Pasteur

( * ) Notice: Subject to any disclaimer, the term of this patent is extended or adjusted under 35 U.S.C. 154(b) by 0 days.

(21) Appl. No.: 12/698,626

(22) Filed: Feb. 2, 2010
(Under 37 CFR 1.47)

(65) Prior Publication Data
US 2010/0133423 A1   Jun. 3, 2010

Related U.S. Application Data

(62) Division of application No. 11/807,719, filed on May 30, 2007, now Pat. No. 7,687,766.

(30) Foreign Application Priority Data

May 31, 2006   (EP) ..................................... 06360021

(51) Int. Cl.
*G01D 5/34* (2006.01)

(52) U.S. Cl. ................ 250/231.13; 250/237 G; 356/617; 33/1 PT; 341/13

(58) Field of Classification Search ............ 250/231.13–231.18, 237 G, 237 R; 356/614, 617; 33/1 PT; 341/11, 13
See application file for complete search history.

(56) References Cited

U.S. PATENT DOCUMENTS

2008/0106995 A1 *   5/2008   Tupinier et al. ............... 369/103
* cited by examiner

*Primary Examiner* — Kevin Pyo
(74) *Attorney, Agent, or Firm* — J. Gordon Lewis

(57) ABSTRACT

An angle sensor for detecting an out-of-round condition includes a disc supporting angle coder rigidly attached to a rotating shaft and at least one fixed optical system including a coherent light source emitting a beam interfering with the angle coder of the support disc in order to code its angular position, a collimator of the said beam before interference and a photo detector of the modulated beam after interference. In one embodiment, two optical systems arranged 90° from each other are employed. An alternative embodiment includes one optical system and the disc includes a circular track radially centred in at least one of its angular positions relative to the incident collimated light beam, and a radially orientated photo detector.

2 Claims, 4 Drawing Sheets

Angular code

Radial code

OUT-OF-ROUND CODER

RELATED APPLICATIONS

This application is a division of U.S. Ser. No. 11/807,719, filed May 30, 2007.

TECHNICAL FIELD

The present invention relates to a device and a process for detection and measurement of out-of-round on an angle sensor including a disc supporting means for angular coding rigidly attached to a rotating shaft.

BACKGROUND OF THE INVENTION

The example acting as the guiding thread of the present description is the steering column of a vehicle. The existence of out-of-round, resulting directly from the manufacture of the steering column, distorts the angular measurement by sometimes accelerating and sometimes retarding the rotation. The curve of the measured angle as a function of the true angle is not, therefore, linear. The rotating system, in particular formed of the steering column and the disc supporting the means for angular coding not being a homokinetic system, it is necessary to measure the out-of-round to perform an angle correction in order to linearize the output signal.

Until now, the means to remedy this problem was principally mechanically formed, i.e. extremely precise mechanical solutions were implemented, with altogether unfavourable economic and therefore industrial consequences.

SUMMARY OF THE INVENTION

The present invention is based not on the use of high precision mechanical systems, but on direct measurement of the out-of-round, which measurement is followed by a software correction. Such a solution is much more economically favourable than the mechanical solutions, the writing of computer software currently being economically advantageous. Moreover, such software is easily duplicated and permits easy modification/improvement, which increases the advantage of a software solution still more. To be implemented, however, this must be based on concrete configurations also developed within the framework of the present invention.

In accordance with a first version, the device for detection of the out-of-round on an angle sensor, including as mentioned above a disc supporting angle coding means rigidly attached to a rotating shaft, also presents at least one fixed optical system provided with a coherent light source emitting a beam interfering with the angle coding means of the support disc in order to code its angular position, a diaphragm delimiting the said beam before interference and a photodetector of the modulated beam after interference, and it is characterised by the fact that it includes two optical systems arranged at 90° from each other.

In addition to permitting measurement of the out-of-round in a manner which will be considered in more detail further on in the text, the existence of the two optical systems provides redundancy, which makes the angle sensor more reliable. In brief, this version permits calculation of a mean angle from which the theoretical correction is made.

In accordance with a modification to the preceding device employing a single light source, the disc includes a circular track radially centred in at least one of its angular positions relative to the collimated incident light beam, and a radially orientated photodetector.

In this case, preferably, the said track is opaque and of constant width. In this case, a conventional technique for modulation of a light signal by shading is involved.

In accordance with another possible modification employing coherent light of laser type, the disc includes a circular track composed of coding cells with computer-generated two-dimensional diffraction holograms and generating at each cell an invariant angle code in a direction tangential to the displacement of the disc, and a radial code differing according to the radial positioning of the light beam relative to the said track.

In fact, the tangential movement and the radial movement are coded simultaneously with the same method. The tangential information does not vary, whatever the radial position, while remaining within the same coding cell. Conversely, the radial information changes.

To this end, the cell is radially sub-divided into n sectors producing distinct radial codes.

In accordance with yet another possible modification, the device for detection of out-of-round of the invention is characterised by the fact that the disc includes coding cells uniformly spaced around its periphery and provided with identical diffraction holograms diffracting the incident light into a signal including spots orientated in a line, the said hologram including a modulation in the form of a stripe or of a plurality of identical stripes arranged in parallel, which modulates the diffracted signal by changing the orientation of the line of spots depending on the relative position of the incident beam and of the hologram, the said line always being perpendicular to the tangent to the stripe or stripes, the position of the centre of the diffraction spot of order 0 remaining unchanged, the said stripe or stripes being so orientated in the cells that a radial modification to the relative position of the incident light beam and of the hologram modifies the orientation of the line of spots, a photodetector being so arranged as to correspond to the displacement of one of the diffraction spots, preferably of order greater than or equal to 1 absolute.

The principle on which this solution is based rests on the interference of the laser beam with a modulation, i.e. a motif of regular curvature. Monitoring the movement of a light spot, which is displaced with the normal to the curvature of the stripe at any point, reveals the relative position of the beam and the cell. The resolution and precision of this monitoring are governed in particular by the form of the stripes (variation of the radius of curvature if it exists) and the fineness of the reading cells of the photodetector.

Yet another modification consists of using a disc which has coding cells uniformly spaced around its periphery and provided with gratings with stripes generating a spot, the position of which on the photodetector is a function of the incident beam/coding cell relative position.

The position on the photodetector is translated by a microcontroller into an eccentricity relative to the ideal centre of rotation, then permitting correction of the angle.

Preferably the stripe or stripes streaking the holograms is (are) an arc or arcs of circle, the radius(i) of which is (are) substantially orientated parallel with the tangent to the displacement of the coding cell.

In this case, the photodetector is orientated substantially radially relative to the disc supporting the angle coding means. In other words, the photodetector has detection cells aligned in the direction of the tangent to the displacement of a spot of order greater than or equal to 1 absolute in the case of the hologram modulated by stripes.

As mentioned above, in accordance with one possible application, the disk of the angle sensor is fixed to the steering column of a motor vehicle.

The invention also relates to a process for detection of out-of-round by means of a device including two fixed optical systems arranged at 90° from each other, and which is principally characterised by the following steps:

measurement of the angles $x_1(t)$ and $x_2(t)$ by the two optical systems at the instant t;

calculation of $(x_1(t)+x_2(t)-90°+\xi)/2$ where $\xi$ represents the positioning error between the two optical systems.

BRIEF DESCRIPTION OF THE DRAWINGS

The invention will now be described in detail, with reference to the attached figures, for which.

DESCRIPTION OF THE PREFERRED EMBODIMENT

Figure 1:
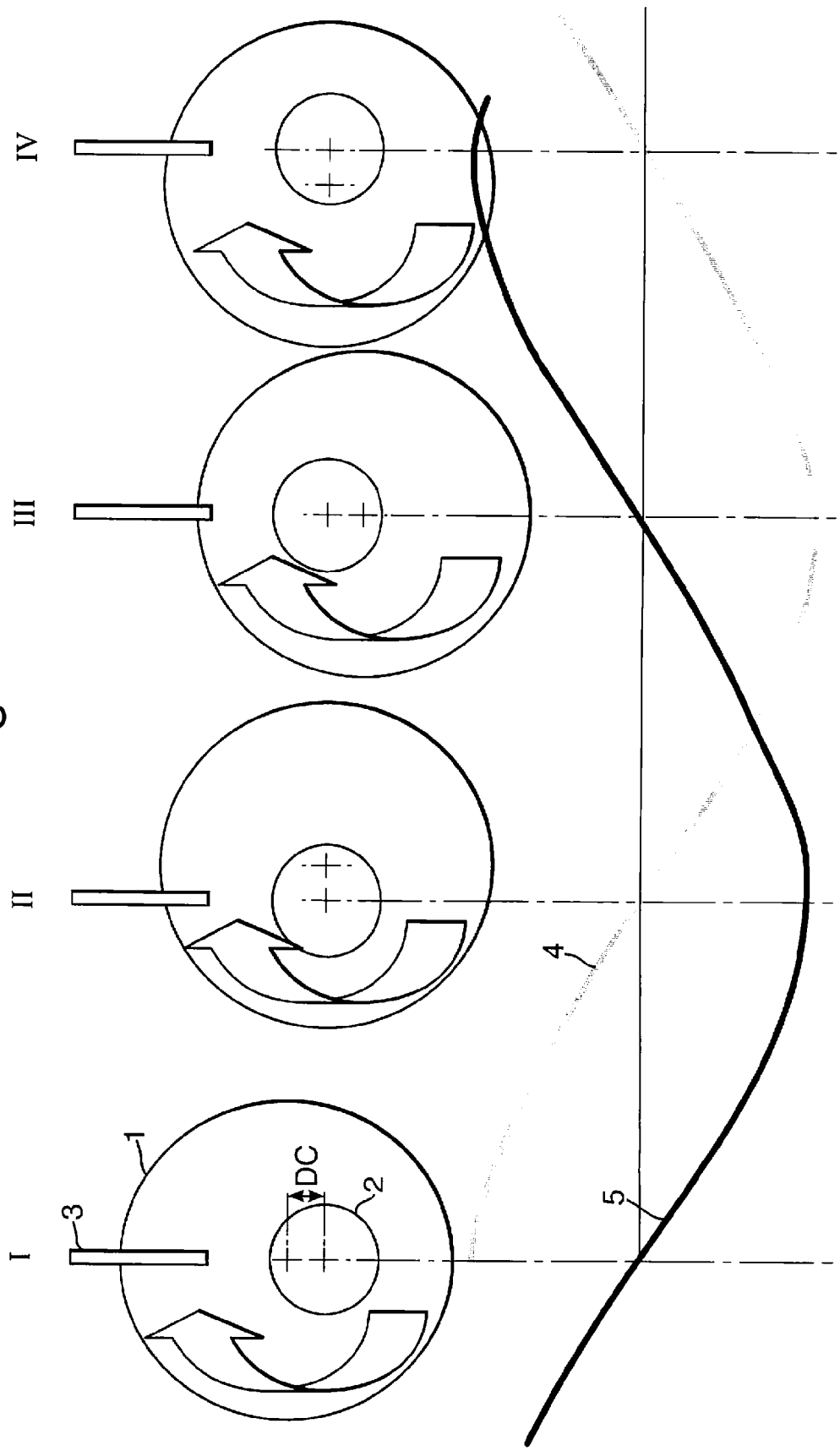
FIG. 1 shows a diagram explaining the problem of out-of-round in a steering column.

With reference to FIG. 1, a disc (1) supporting a coding means is rigidly attached to a steering column (2). The out-of-round is represented by the distance DC. The diagram of FIG. 1 shows the rotating assembly formed of the support disc (1) and the steering column (2) in four distinct phases of rotation, situated at 90° from each other. A photodetector (3) is provided for measurement of the out-of-round DC. In the radial direction of the measurement performed by this photodetector, the signal is that represented by the grey curve (4). The out-of-round DC is measured and maximum but in opposite directions in phases I and III respectively, while it is zero in phases II and IV. The correction curve (5) appears in black. It permits correction of the out-of-round as measured, when this is necessary, i.e. in phases I and III.

Figure 2:
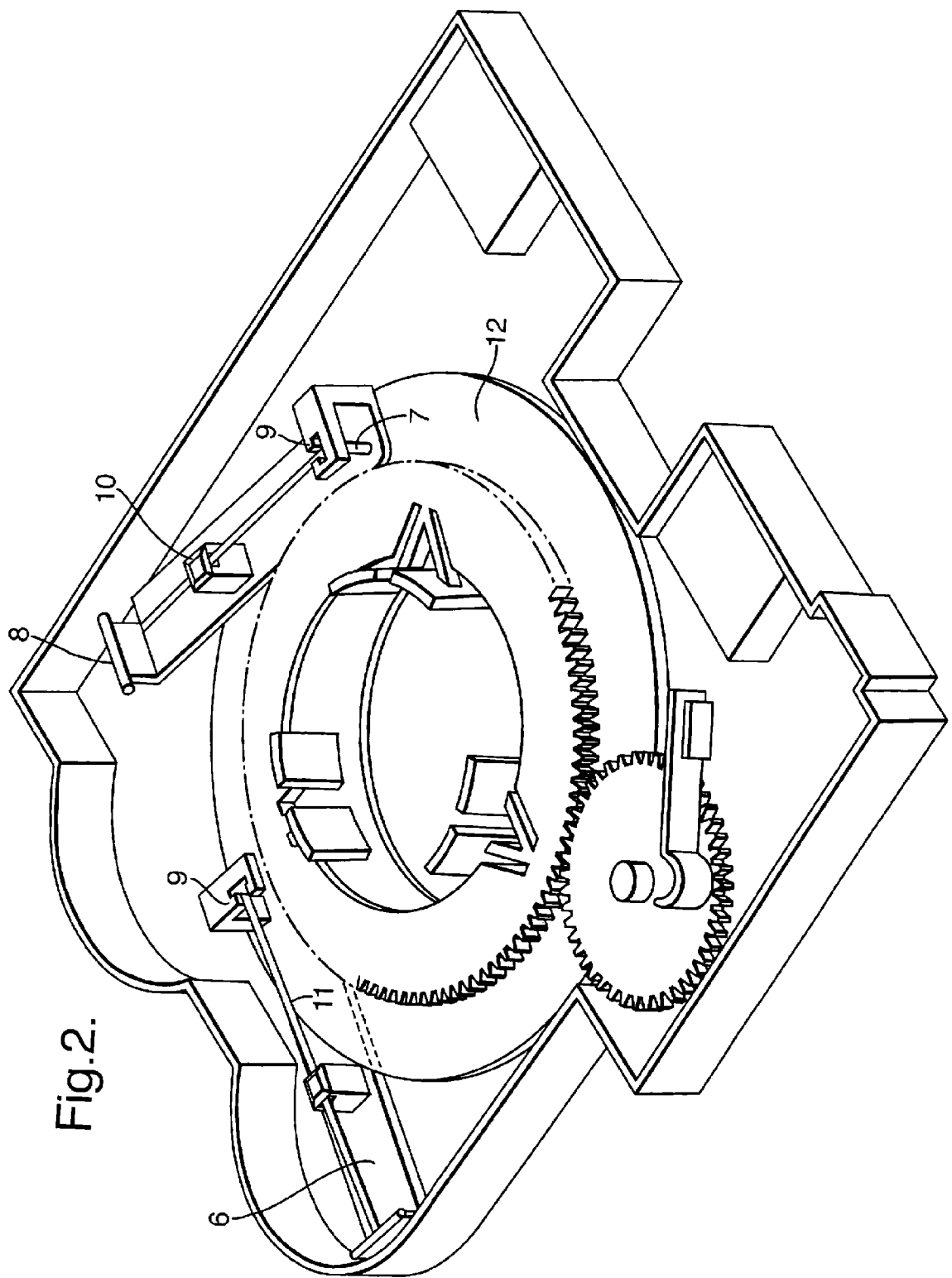
FIG. 2 is a perspective view of a solution of the invention with two fixed optical systems.

With reference to FIG. 2, two identical optical systems (6) fixed to a frame are placed at 90° from each other. They are each composed of a laser diode (7), a photodetector (8), and a mirror (9) reorientating the beam (11) from the diode (7) towards the photodetector (8). A spatial filter (10) is also provided in the path of the beam (11).

These two optical systems (6) permit measurement, in two places, of the angular position of the steering column (not shown) by co-operation with coding means situated on the disc (12). In this case, these coding means consist of coding cells with diffraction holograms modulating the incident beam into a digital optical code corresponding bijectively to a single coding cell.

Correction of the out-of-round is then effected by forming the mean between these two angles, using for example the following formula:

$$\alpha(t)=(\alpha_1(t)+\alpha_2(t)-90°+\xi)/2$$

$\xi$ in this case representing the positioning difference error between the two optical systems (6). Calculation of the mean permits limitation of the error due to the out-of-round. Where necessary, other algorithms permit further refinement of this correction.

Figure 3:
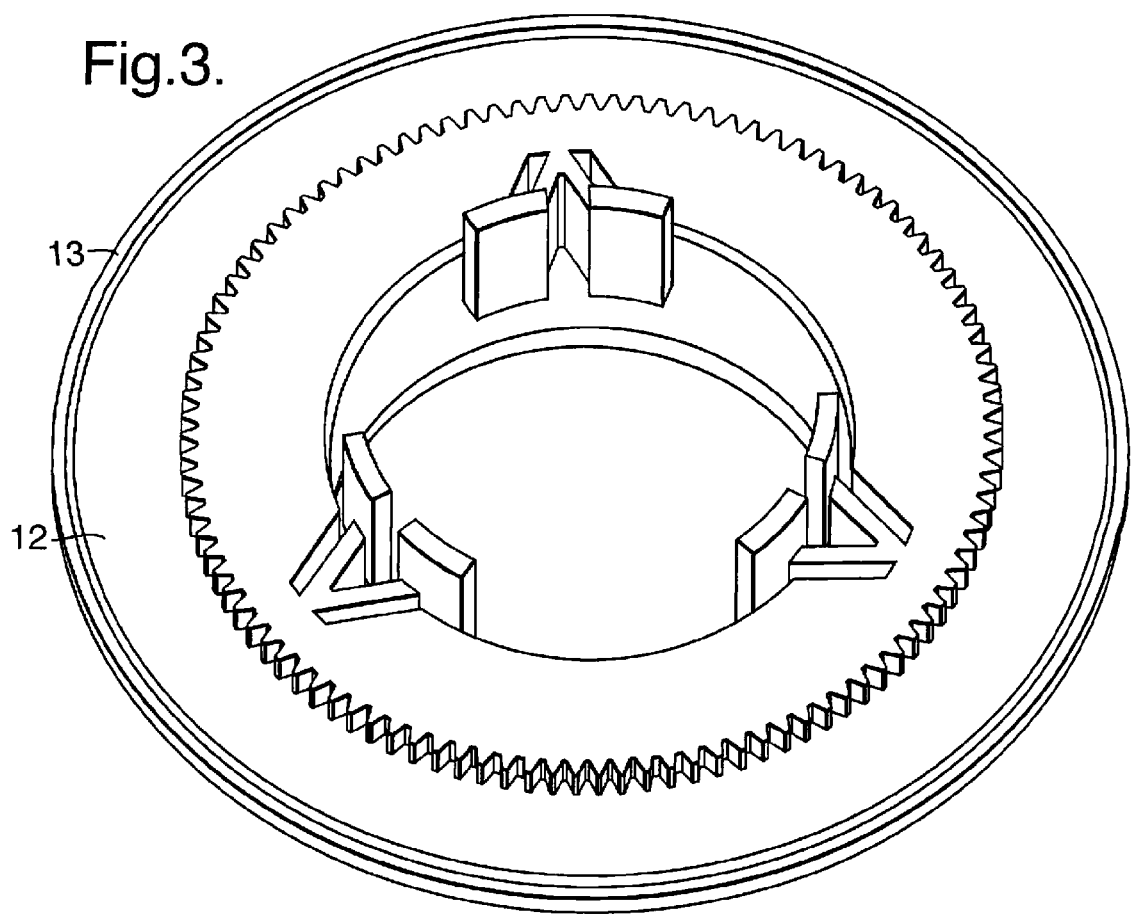
FIG. 3 shows a coding disc provided with an opaque peripheral track permitting modulation of the incident beam in accordance with the variation of the out-of-round.
Figure 4:
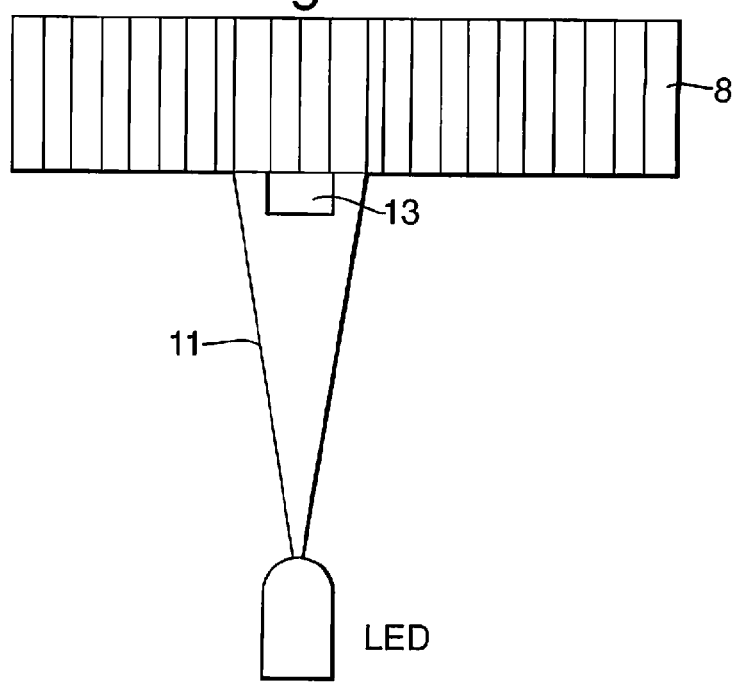
FIG. 4 explains the measurement of the out-of-round in such a configuration.

FIG. 3, relating to a modification to the preceding configuration, shows a disc (12) removed from the angle sensor casing and provided with an opaque track (13) permitting measurement of the out-of-round in a manner explained in FIG. 4. The incident light beam (11) interferes with the opaque track (13) in such a manner that the signal modulated by this interference can reflect the out-of-round on the photodetector (8). Thus, for example, if the position shown in FIG. 4 is that prevailing in the absence of out-of-round, with centring of the track (13) in the incident beam (11), the cells of the illuminated photodetector (8) are separate.

Supposing that the opaque track (13) is no longer centred in the beam (11), the result could schematically be that two contiguous cells are illuminated, on one side or the other of the track (13) respectively, depending on the phase of rotation of the disc (12). The software calculation of the out-of-round and its correction results from the location of the illuminated detection cells.

Figure 5:
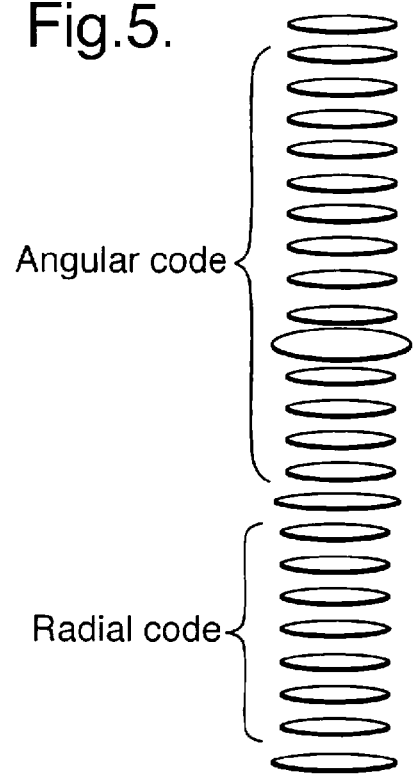
FIG. 5 shows diagrammatically the coding obtained by means of a solution with coding cells with two-dimensional diffraction holograms.

In accordance with a modification, the opaque track (13) is replaced by a track including coding cells with two-dimensional diffraction holograms, i.e. simultaneously coding the tangential movement and the radial movement of the incident light beam (11) relative to the said cell. The result, in terms of optical code, is shown in FIG. 5. If each cell is radially sub-divided into for example 128 sectors ($2^7$), seven light spots, and consequently seven coding bits, are allocated to radial coding. The angular coding, for its part, is performed in known manner.

Figure 6:
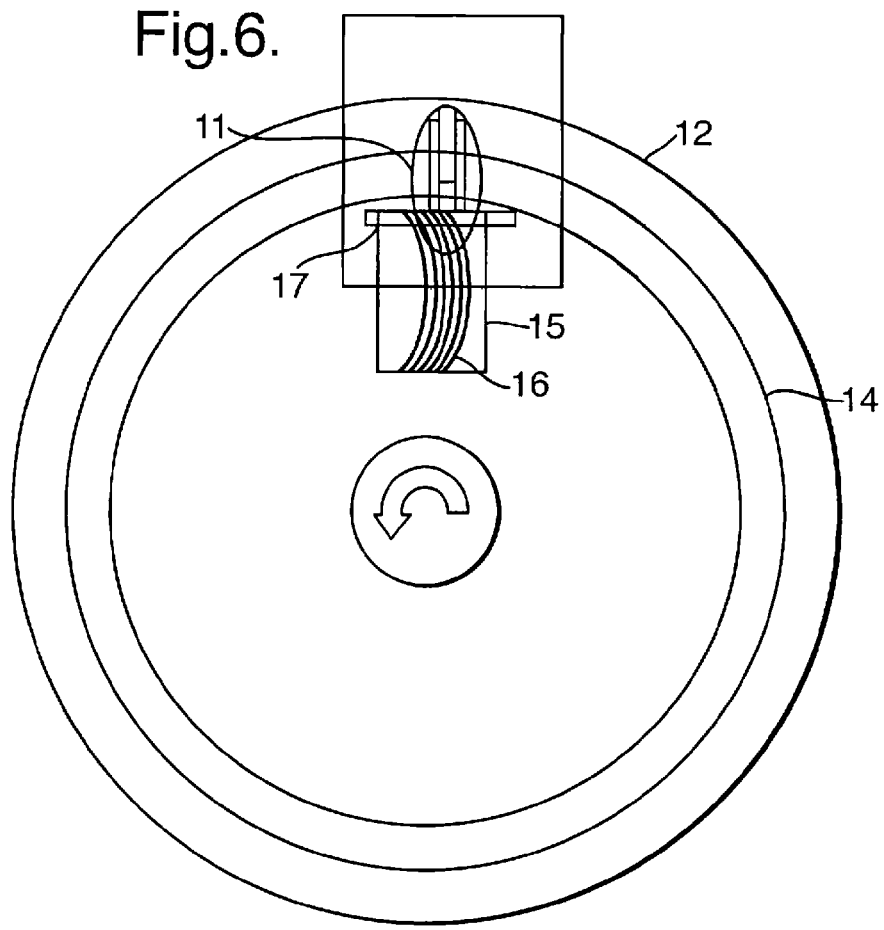
FIG. 6 shows diagrammatically the operation of a solution with modulation changing the orientation of a line of diffraction spots produced by the hologram included in the cell provided with it.

With reference to FIG. 6, yet another version permitting detection of the out-of-round is shown. The disc (12) includes a track (14) provided with coding cells with diffraction holograms permitting absolute angular detection in one rotation. Other coding cells (15) are distributed around the periphery of the disc and permit radial coding permitting measurement of the out-of-round. These identical coding cells (15) also include a diffraction hologram, diffracting the incident beam (11) into aligned light spots. Modulation in the form of stripes (16) modulates this signal, according to the relative position of the incident beam (11) and the cell (15), by rotation of the alignment of the spots of axis situated at the centre of the light spot of order 0. The diaphragm (17) so delimits the incident beam (11) that, depending on the amplitude of the out-of-round, the collimated beam has a position which varies relative to the said stripes (16). Monitoring of the displacement of one of the spots (preferably of order greater than or equal to 1) permits evaluation of the said out-of-round. Strictly speaking, this spot performs a rotation, which can however be assimilated to a translation on the scale of the cell (15) and of the corresponding relative displacement of the collimated incident beam (11). A specific photodetector (not shown) is provided to measure the corresponding radial displacement.

Instead of a hologram, these cells (15) could include a grating.

Generally, the examples cited above must not be considered as limiting to the invention.

The invention claimed is:

1. A device for detection of out-of-round on an angle sensor including a disc supporting angle coding means rigidly attached to a rotating shaft and a fixed optical system including a coherent light source emitting a beam interfering with the angle coding means of the support disc in order to code its angular position, means for collimation of the said beam before interference and a photo detector of the modulated beam after interference, wherein the disc includes a circular track composed of coding cells with computer-generated two-dimensional diffraction holograms and generating on each cell an invariant angle code in a direction tangential to the displacement of the disc, and a radial code differing in accordance with the radial positioning of the light beam relative to the said track.

2. A device for detection of out-of-round of claim 1, wherein the cell is sub-divided, in a radial direction, into n sectors producing distinct radial codes.

* * * * *